(12) United States Patent
Tsukashima et al.

(10) Patent No.: US 7,928,617 B2
(45) Date of Patent: Apr. 19, 2011

(54) RESOLVER FIXING STRUCTURE

(75) Inventors: Hiroyuki Tsukashima, Nishikamo-gun (JP); Hiromi Makiuchi, Iida (JP)

(73) Assignees: Toyota Jidosha Kabushiki Kaisha, Toyota (JP); Tamagawa Seiki Co., Ltd., Iida (JP)

( * ) Notice: Subject to any disclaimer, the term of this patent is extended or adjusted under 35 U.S.C. 154(b) by 110 days.

(21) Appl. No.: 11/659,698

(22) PCT Filed: Jan. 27, 2006

(86) PCT No.: PCT/JP2006/301897
§ 371 (c)(1),
(2), (4) Date: Feb. 8, 2007

(87) PCT Pub. No.: WO2006/080567
PCT Pub. Date: Aug. 3, 2006

(65) Prior Publication Data
US 2008/0024021 A1    Jan. 31, 2008

(30) Foreign Application Priority Data

Jan. 31, 2005   (JP) ................................. 2005-023035

(51) Int. Cl.
*H02K 11/00* (2006.01)
*H02K 23/66* (2006.01)
*H02K 11/02* (2006.01)

(52) U.S. Cl. ................... 310/68 B; 310/68 A; 310/68 E; 310/68 R; 310/68 D; 310/111; 310/51; 310/85

(58) Field of Classification Search ....... 310/68 A–68 E, 310/68 R, 51, 111, 85; *H02K 11/02, 23/66, H02K 11/00*
See application file for complete search history.

(56) References Cited

U.S. PATENT DOCUMENTS

| | | | | |
|---|---|---|---|---|
| 3,320,451 A | * | 5/1967 | Wiley | 310/259 |
| 4,605,889 A | * | 8/1986 | Luneau | 322/61 |
| 4,659,953 A | * | 4/1987 | Luneau | 310/111 |
| 4,735,751 A | * | 4/1988 | Guntly | 261/35 |
| 4,755,751 A | * | 7/1988 | Ray | 324/207.18 |
| RE32,857 E | * | 2/1989 | Luneau | 322/61 |
| 4,962,331 A | * | 10/1990 | Smith | 310/216.001 |
| 5,234,081 A | * | 8/1993 | Watanabe | 188/74 |
| 5,655,988 A | | 8/1997 | Schnell | |
| 5,856,709 A | * | 1/1999 | Ibaraki et al. | 290/45 |

(Continued)

FOREIGN PATENT DOCUMENTS

EP        1 574 823 A1      9/2005

(Continued)

OTHER PUBLICATIONS

Kitazawa (JP 09-065617, IDS, English Translation).*

(Continued)

*Primary Examiner* — Quyen Leung
*Assistant Examiner* — John K Kim
(74) *Attorney, Agent, or Firm* — Oliff & Berridge, PLC

(57) ABSTRACT

A resolver fixing structure which does not cause distortion at a resolver stator is provided. The resolver fixing structure arranged between coil ends of a stator constituting a rotating electrical machine includes a ring portion as a base member having a hole, and a resolver stator press-fitted into the hole. The resolver stator has an outer circumferential portion provided with a shield member coming into contact with the hole.

19 Claims, 4 Drawing Sheets

U.S. PATENT DOCUMENTS

| | | | | |
|---|---|---|---|---|
| 5,955,807 | A * | 9/1999 | Kajiura et al. | 310/156.66 |
| 6,617,715 | B1 * | 9/2003 | Harris et al. | 310/54 |
| 6,617,726 | B1 | 9/2003 | Tsergas | |
| 7,197,944 | B2 * | 4/2007 | Koyagi et al. | 73/862.322 |
| 7,282,907 | B2 * | 10/2007 | Inoue et al. | 324/173 |
| 7,378,767 | B2 * | 5/2008 | Kusumoto et al. | 310/68 D |
| 7,476,996 | B2 * | 1/2009 | Makiuchi et al. | 310/71 |
| 2001/0038797 | A1 * | 11/2001 | Makino et al. | 417/410.1 |
| 2002/0005674 | A1 | 1/2002 | Hayashi | 310/168 |
| 2002/0175574 | A1 * | 11/2002 | Okazaki et al. | 310/68 B |
| 2004/0016591 | A1 * | 1/2004 | Kojo et al. | 180/443 |
| 2004/0027015 | A1 * | 2/2004 | Utsumi et al. | 310/68 R |
| 2004/0041492 | A1 * | 3/2004 | Ishikawa et al. | 310/218 |
| 2004/0051404 | A1 * | 3/2004 | Kurosawa et al. | 310/49 R |
| 2004/0061396 | A1 * | 4/2004 | Narita et al. | 310/112 |
| 2005/0077789 | A1 * | 4/2005 | Kusumoto et al. | 310/68 B |
| 2005/0174106 | A1 * | 8/2005 | Inoue | 324/164 |
| 2005/0200211 | A1 * | 9/2005 | Hsu et al. | 310/51 |
| 2005/0206253 | A1 * | 9/2005 | Hertz et al. | 310/68 B |
| 2005/0222740 | A1 * | 10/2005 | Inoue et al. | 701/70 |
| 2005/0241346 | A1 * | 11/2005 | Choi | 68/140 |
| 2006/0226719 | A1 * | 10/2006 | Nakanishi et al. | 310/68 B |
| 2006/0238040 | A1 * | 10/2006 | Utsumi et al. | 310/68 B |
| 2008/0024021 | A1 * | 1/2008 | Tsukashima et al. | 310/68 D |

FOREIGN PATENT DOCUMENTS

| | | |
|---|---|---|
| JP | U 1-171563 | 12/1989 |
| JP | A 9-65617 | 3/1997 |
| JP | A 2000-177609 | 6/2000 |
| JP | A 2002-295500 | 10/2002 |
| JP | A 2003-121107 | 4/2003 |
| JP | A 2004-232795 | 8/2004 |
| RU | 2155893 | 9/2000 |
| RU | 2208513 | 7/2003 |
| WO | WO 03075438 A1 * | 9/2003 |

OTHER PUBLICATIONS

Notice of Grounds of Rejection issued in Japanese Patent Application No. 2007-500662; mailed Apr. 6, 2010; with English-language translation.

* cited by examiner

RESOLVER FIXING STRUCTURE

TECHNICAL FIELD

The present invention relates to a resolver fixing structure, and more particularly to a resolver fixing structure which detects the rotation of a rotating electrical machine.

BACKGROUND ART

Conventional resolvers are disclosed, for example, in Japanese Patent Laying-Open No. 9-065617 (Document 1) and Japanese Utility Model Laying-Open No. 1-171563 (Document 2).

Document 1 discloses a resolver-equipped motor which is provided with a shield cover so as to cover the coil of the resolver.

Document 2 discloses a structure in which the outer circumference of the resolver arranged between the coil ends is covered with a magnetic shielding plate.

When the resolver itself is directly press-fitted in the case where the resolver is fixed by press-fitting, distortion occurs at the stator core of the resolver to thereby cause detection accuracy of the resolver to be reduced.

DISCLOSURE OF THE INVENTION

The present invention is directed to solve the above-described problem, and provides a resolver fixing structure which is capable of preventing distortion.

A resolver fixing structure according to the present invention which is arranged between coil ends of a stator constituting a rotating electrical machine, includes a base body having a hole and a resolver press-fitted into the hole. A shield member coming into contact with the hole is provided at an outer circumferential portion of the resolver.

In the resolver fixing structure configured as described above, since the resolver is press-fitted into the hole with the shield member interposed therebetween, distortion of a resolver stator core due to press-fit can be reduced. Consequently, a resolver having high detection accuracy can be provided.

Preferably, the resolver includes a resolver stator and further includes at least three coils provided in the resolver stator.

Preferably, the resolver stator includes a teeth portion of a stator core and a back yoke portion of the stator core for fixing the teeth portion of the stator core.

Preferably, the shield member is attached to the back yoke portion of the stator core by an adhesive or by welding.

Preferably, the resolver stator is attached to a motor cover with a bolt.

Preferably, the shield member is formed of magnetic material.

According to the present invention, a resolver having high detection accuracy can be provided.

BEST MODES FOR CARRYING OUT THE INVENTION

Figure 1:
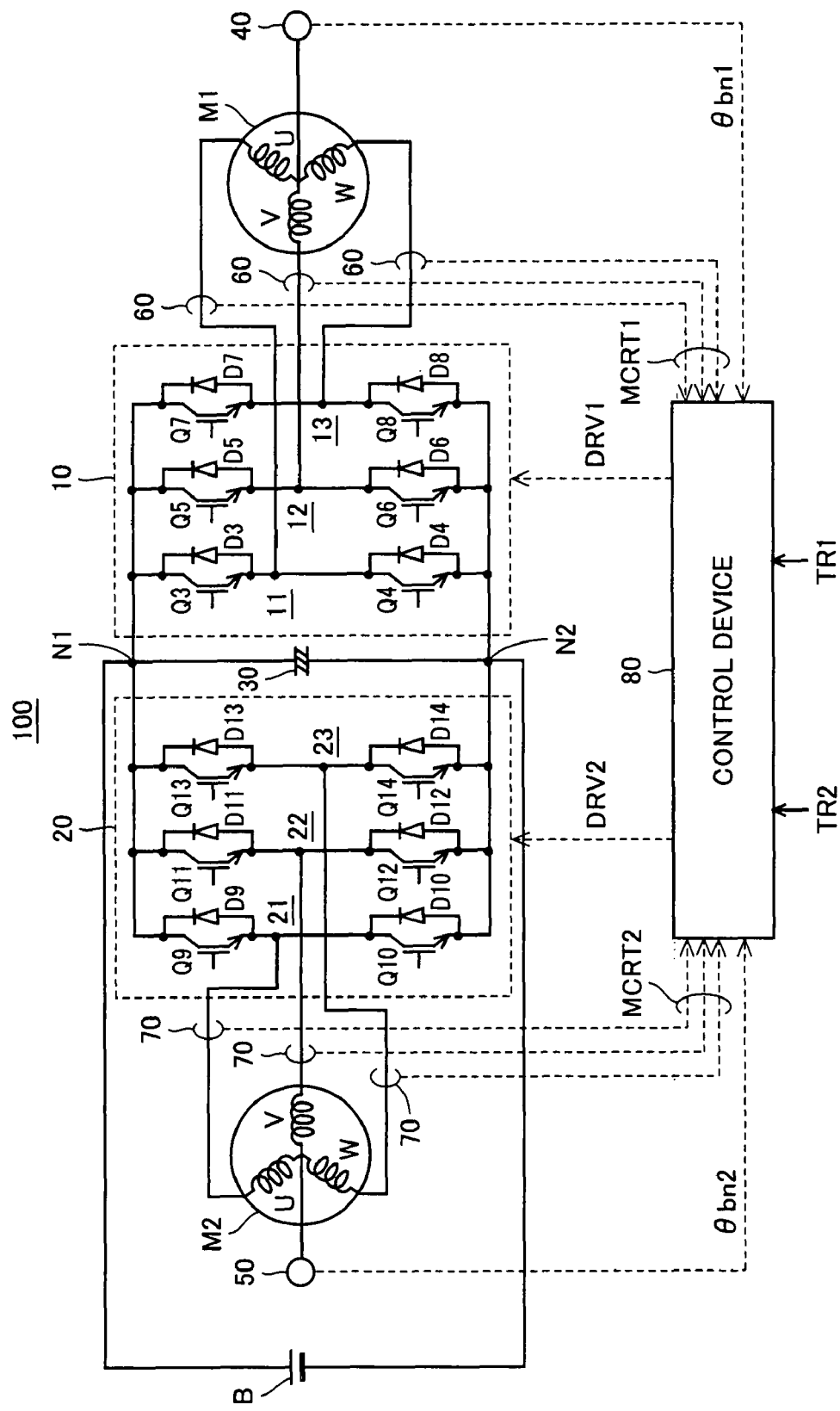
FIG. 1 is a block diagram of a motor drive device in which a resolver according to the present invention is used.

The embodiments of the present invention will be hereinafter described with reference to the drawings, in which the same or corresponding components in the following embodiments are designated by the same reference characters, and description thereof will not be repeated.

First Embodiment

FIG. 1 is a block diagram of a motor drive device in which a resolver according to the present invention is used. Referring to FIG. 1, a motor drive device 100 according to the first embodiment of the present invention includes, a direct-current (DC) power supply B, inverters 10 and 20, a capacitor 30, resolvers 40 and 50, current sensors 60 and 70, and a control device 80.

Inverter 10 includes a U-phase arm 11, a V-phase arm 12 and a W-phase arm 13. U-phase arm 11, V-phase arm 12 and W-phase arm 13 are connected in parallel between a node N1 and a node N2.

U-phase arm 11 includes NPN transistors Q3 and Q4 connected in series, V-phase arm 12 includes NPN transistors Q5 and Q6 connected in series, and W-phase arm 13 includes NPN transistors Q7 and Q8 connected in series. Furthermore, diodes D3-D8 are connected between the collector and the emitter of each of NPN transistors Q3-Q8, respectively, to supply current from the emitter side to the collector side.

Inverter 20 includes a U-phase arm 21, a V-phase arm 22 and a W-phase arm 23. U-phase arm 21, V-phase arm 22 and W-phase arm 23 are connected in parallel between node N1 and node N2. U-phase arm 21 includes NPN transistors Q9 and Q10 connected in series, V-phase arm 22 includes NPN transistors Q11 and Q12 connected in series, and W-phase arm 23 includes NPN transistors Q13 and Q14 connected in series. Moreover, diodes D9-D14 are connected between the collector and the emitter of each of NPN transistors Q9-Q14, respectively, to supply current from the emitter side to the collector side.

An intermediate point of each phase arm of inverter 10 is connected to each phase end of each phase coil of an alternating-current (AC) motor M1. An intermediate point of each phase arm of inverter 20 is connected to each phase end of each phase coil of an AC motor M2. That is, AC motors M1 and M2 are 3-phase permanent magnet motors, in which three coils of the U-, V- and W-phases each have one end connected in common to a neutral point. The other end of the U-phase coil of AC motor M1 is connected to an intermediate point between NPN transistors Q3 and Q4, the other end of the V-phase coil is connected to an intermediate point between NPN transistors Q5 and Q6, and the other end of the W-phase coil, is connected to an intermediate point between NPN transistors Q7 and Q8. Furthermore, the other end of the U-phase coil of AC motor M2 is connected to an intermediate point between NPN transistors Q9 and Q10, the other end of the V-phase coil is connected to an intermediate point between NPN transistors Q11 and Q12, and the other end of the W-phase coil is connected to an intermediate point between NPN transistors Q13 and Q14.

Capacitor 30 is connected in parallel with inverters 10 and 20 between node N1 and node N2.

DC power supply B includes a secondary battery such as a nickel hydrogen battery or a lithium-ion battery. Based on a drive signal DRV1 from control device 80, inverter 10 converts the DC voltage from capacitor 30 into an AC voltage to drive AC motor M1. Based on a drive signal DRV2 from control device 80, inverter 20 converts the DC voltage from capacitor 30 into an AC voltage to drive AC motor M2.

Capacitor 30 smoothes the DC voltage from DC power supply B and supplies the smoothed DC voltage to inverters 10 and 20. Resolver 40 which is attached to the rotation shaft of AC motor M1 detects a rotation angle θbn1 of a rotor of AC motor M1 to output it to control device 80. Resolver 50 which is attached to the rotation shaft of AC motor M2 detects a rotation angle θbn2 of a rotor of AC motor M2 to output it to control device 80.

Current sensor 60 detects a motor current MCRT1 flowing through AC motor M1, and outputs the detected motor current MCRT1 to control device 80. Current sensor 70 detects a motor current MCRT2 flowing through AC motor M2, and outputs the detected motor current MCRT2 to control device 80.

It is to be noted that although respective numbers of current sensors 60 and 70 are three in FIG. 1, they may be at least two.

Control device 80 uses a corrected rotation angle θn1 and a torque command value TR1 from an external ECU (Electronic Control Unit) to generate drive signal DRV1 for driving NPN transistors Q3-Q8 of inverter 10, and outputs the generated drive signal DRV1 to NPN transistors Q3-Q8.

Control device 80 also uses a corrected rotation angle θn2 and a torque command value TR2 from the external ECU to generate drive signal DRV2 for driving NPN transistors Q9-Q14 of inverter 20, and outputs the generated drive signal DRV2 to NPN transistors Q9-Q14.

Figure 2:
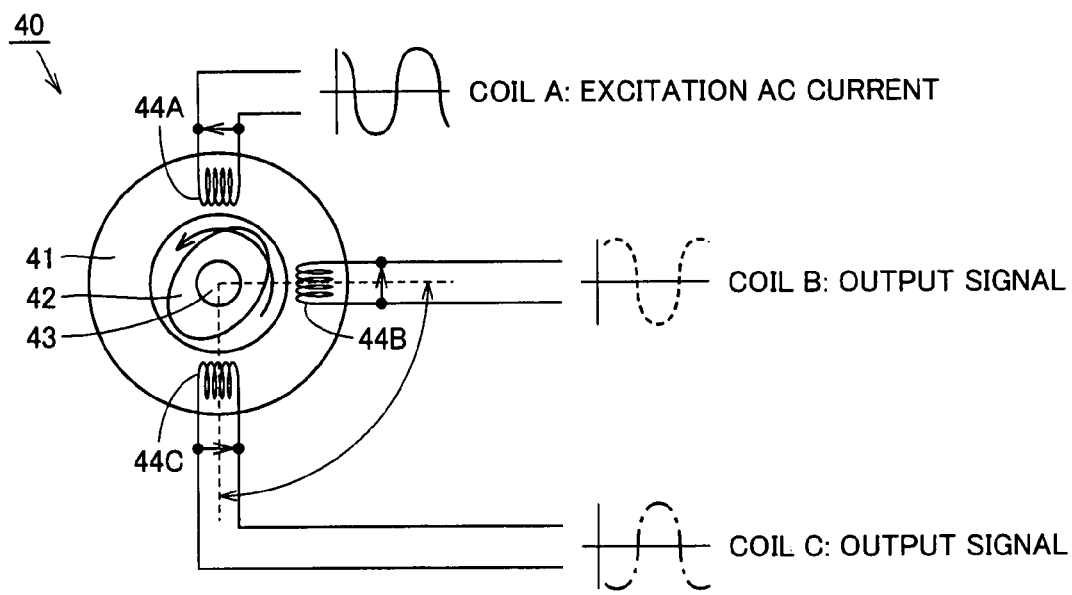
FIG. 2 is a schematic diagram of the resolver.

FIG. 2 is a schematic diagram of the resolver. Referring to FIG. 2, resolver 40 is a rotation sensor, and functions to detect the magnet position with high accuracy in order to provide highly efficient control of a motor and a generator. Resolver 40 includes a resolver stator 41, a rotation shaft 43 provided at the center of resolver stator 41, and a resolver rotor 42 which is in the shape of an ellipse and attached around the outer circumference of rotation shaft 43. Resolver stator 41 is provided with at least three coils 44A, 44B and 44C.

Resolver rotor 42 has the shape of an ellipse in the case of a two-pole resolver 40. In the case of resolver 40 having two or more poles, however, the shape of resolver rotor 42 is not limited to an ellipse.

Excitation AC current is supplied to coil 44A, and an output based on this is detected in coils 44B and 44C.

Two output coils 44B and 44C are electrically shifted by 90°. Since resolver rotor 42 has the shape of an ellipse, rotation of resolver rotor 42 causes the distance between resolver stator 41 and resolver rotor 42 to be changed.

When an AC current is supplied to coil 44A, outputs in accordance with the position of resolver rotor 42 are generated in coils 44B and 44C. Based on the difference between these outputs, an absolute position can be detected. The resolver is also used as a rotation sensor by having the change amount of the position within a fixed period of time calculated by means of a CPU (central processing unit).

Figure 3:
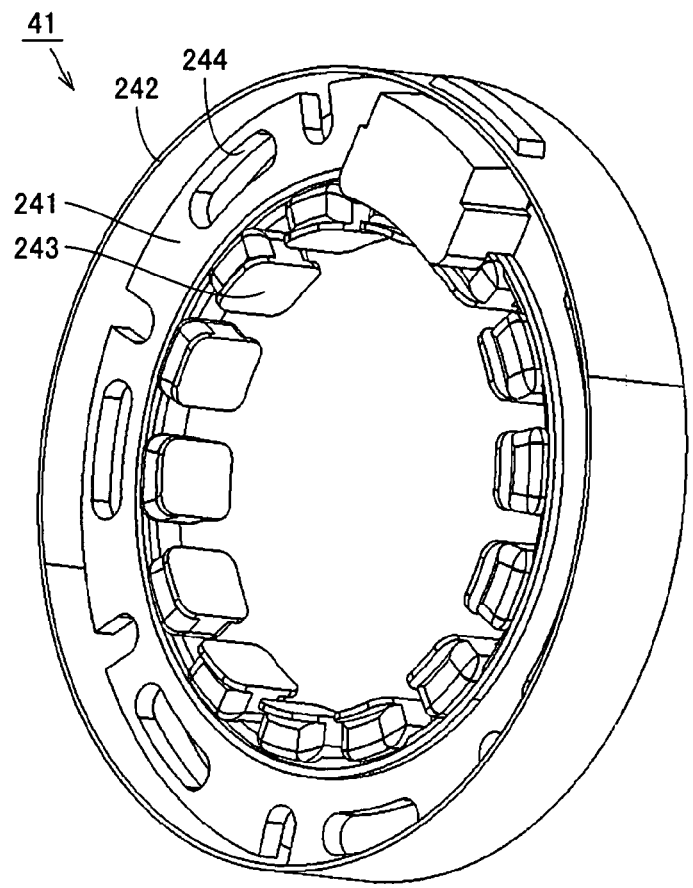
FIG. 3 is a perspective view of a resolver stator according to a first embodiment of the present invention.

FIG. 3 is a perspective view of the resolver stator according to the first embodiment of the present invention. Referring to FIG. 3, resolver stator 41 includes a teeth portion 243 of a stator core, a back yoke portion 241 of the stator core for fixing teeth portion 243 of the stator core, and a shield member 242 provided around the outer circumference of back yoke portion 241 of the stator core.

Teeth portion 243 of the stator core is made of magnetic material (iron alloy), and is formed of a plurality of protrusions. Coils 44A to 44C shown in FIG. 2 are wound around teeth portion 243 of the stator core. The protrusions of teeth portion 243 of the stator core are concentrically arranged at a distance from each other.

On the outer circumference of teeth portion 243 of the stator core, back yoke portion 241 of the stator core is provided, which is used as the framework of resolver stator 41. Teeth portion 243 of the stator core is fixed on the inner circumference side of back yoke portion 241 of the stator core. Teeth portion 243 of the stator core and back yoke portion 241 of the stator core may be made of the same material or different materials. Back yoke portion 241 of the stator core is the frame of resolver stator 41, and is provided with a plurality of holes 244 each in the shape of a long hole extending in the circumferential direction. Shield member 242 is fixed on the outer circumference side of back yoke portion 241 of the stator core. Shield member 242 qualified as a shield ring is attached to back yoke portion 241 of the stator core by an adhesive or by welding.

Shield member 242 is made of magnetic material (electromagnetic steel plate). Since the magnetic field generated from the coil ends of the motor causes the magnetic flux to be concentrated on shield member 242, the magnetic field has less influence on teeth portion 243 of the stator core which is a main body. As a result, resolver 40 generates a highly accurate angle signal, allowing torque reduction and vehicle vibration in the motor control to be suppressed.

Figure 4:
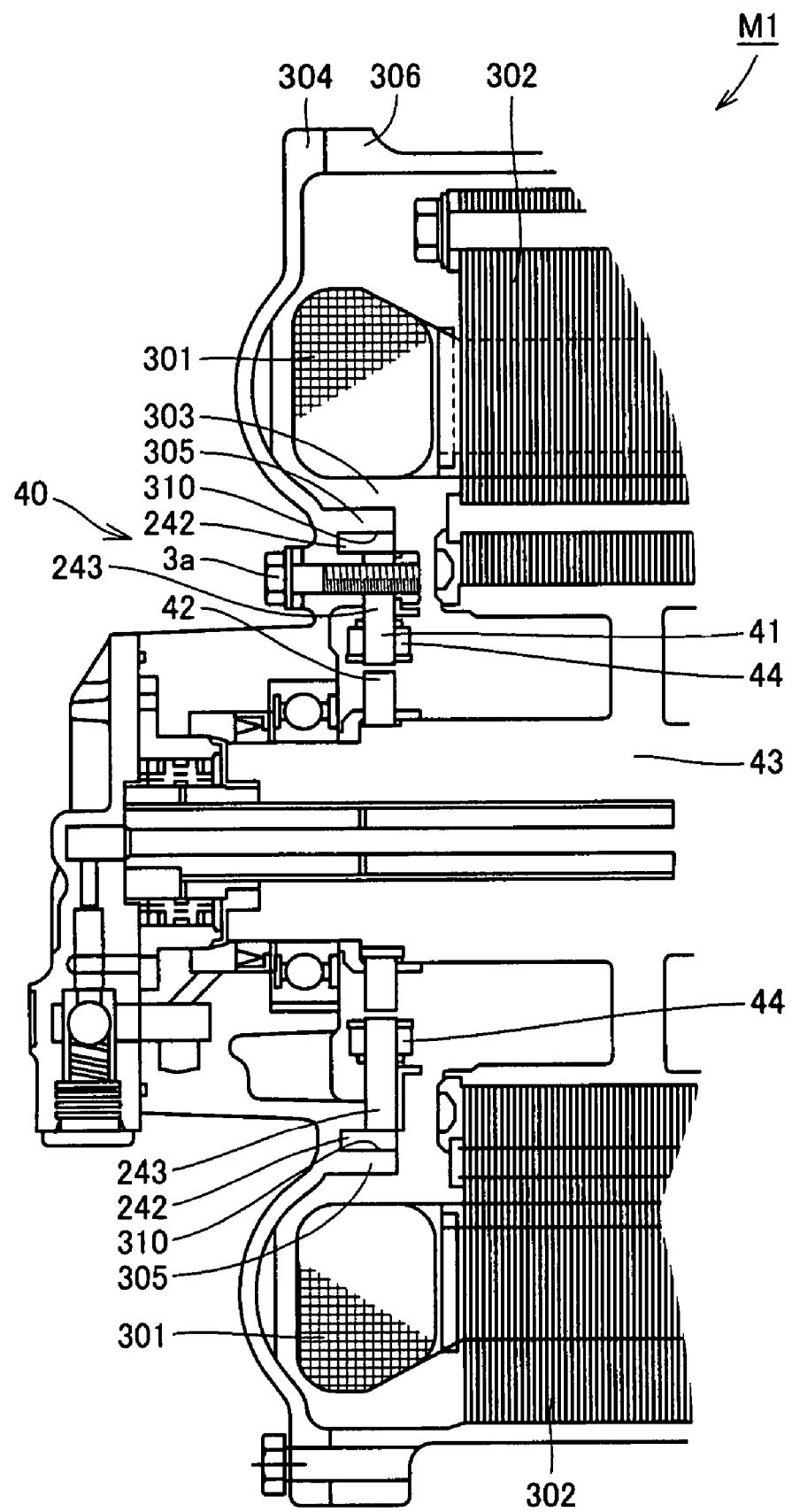
FIG. 4 is a cross sectional view of the resolver incorporated in a rotating electrical machine.

FIG. 4 is a cross sectional view of the resolver incorporated in a rotating electrical machine. Referring to FIG. 4, the rotating electrical machine (AC motor M1) incorporating resolver 40 formed of resolver stator 41 and resolver rotor 42, includes a motor case 306 supporting one end of rotation shaft 43 and accommodating the rotating electrical machine main unit, and a motor cover 304 attached to motor case 306 and supporting the other end of rotation shaft 43. The resolver is incorporated between coil ends 301 of the rotating electrical machine, resolver rotor 42 is attached to rotation shaft 43, and resolver stator 41 is attached to motor cover 304 by means of a bolt 3a and the like.

Motor cover 304 includes a ring portion 305 being in the shape of a flange and having a hole 310 provided therein. Shield member 242 is press-fitted into hole 310 which may be tapered. Since shield member 242 and back yoke portion 241 of the stator core are press-fitted into hole 310, resolver stator 41 is pressed from the direction of hole 310 and ring portion 305 toward the center. The coil wound around a stator 302 of the rotating electrical machine has an end which is coil end 301. Resolver stator 41 is arranged between opposite coil ends 301. A coil 44 is wound around resolver stator 41. Resolver stator 41 faces resolver rotor 42.

The resolver fixing structure according to the present invention, which is the fixing structure of resolver 40 arranged between coil ends 301 of stator 302 constituting the rotating electrical machine, includes ring portion 305 as a base body having hole 310, and resolver 40 press-fitted into hole 310. Shield member 242 coming into contact with hole 310 is provided at the outer circumferential portion of resolver stator 41 constituting resolver 40.

That is, according to the resolver fixing structure arranged between coil ends 301 of stator 302, resolver stator 41 is fixed by press-fit on motor cover 304 which is a mating material, with shield member 242 interposed on the outer circumferential portion of resolver stator 41. In this case, this press-fit via shield member 242 allows distortion of resolver stator 41 caused by press-fit to be reduced.

Second Embodiment

Figure 5:
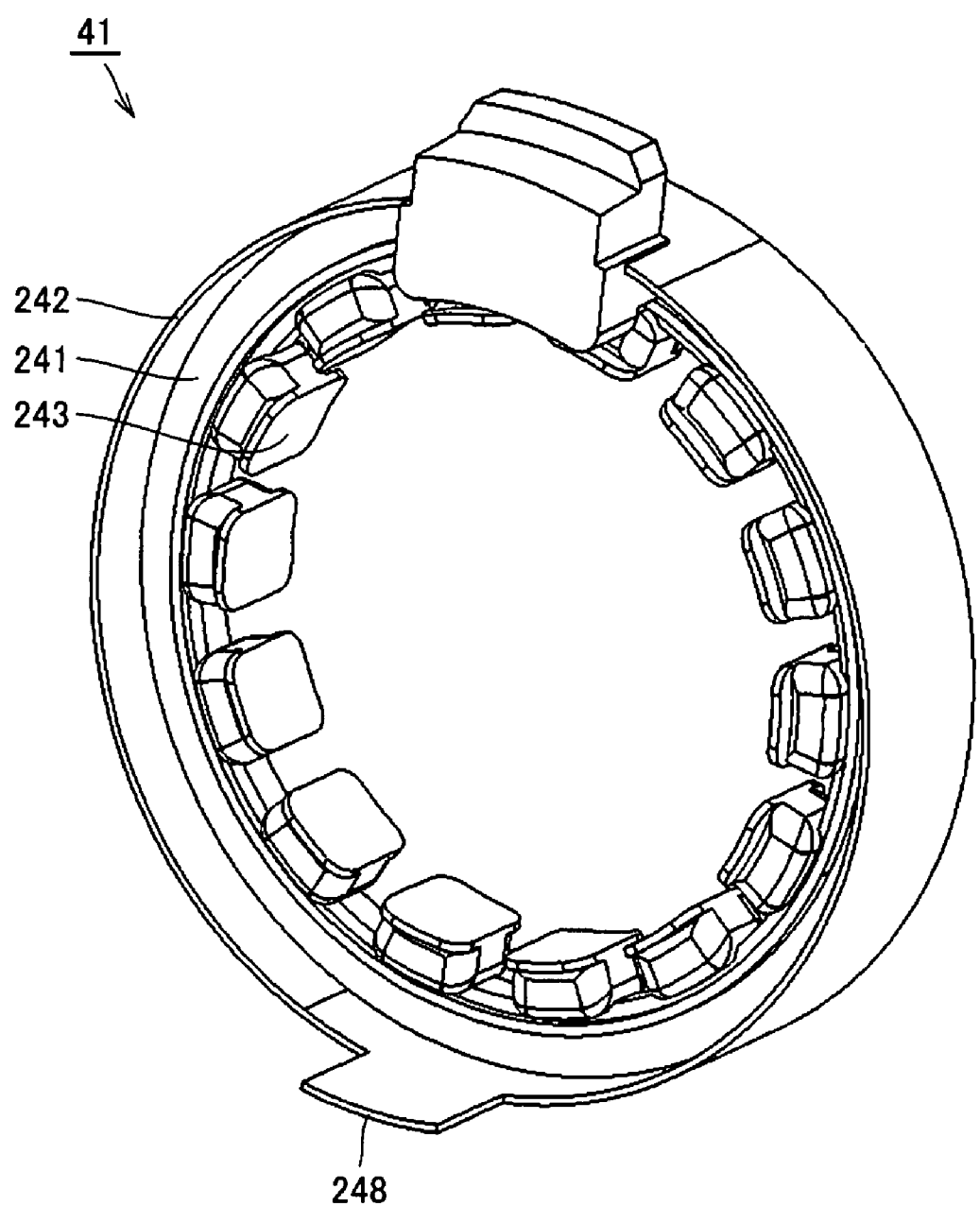
FIG. 5 is a perspective view of a resolver stator according to a second embodiment of the present invention.

FIG. 5 is a perspective view of the resolver stator according to a second embodiment of the present invention. Referring to FIG. 5, resolver stator 41 according to the second embodiment of the present invention differs from resolver stator 41 according to the first embodiment in that no hole is provided for inserting a bolt therethrough. Since a resolver is conventionally fixed by an iron plate which is called a resolver cover through which a nut is inserted, it had to be provided with a long hole in the stator portion so as to insert a bolt therethrough and adjust the electrical zero point position. This causes the size of the resolver to be unnecessarily increased. That is, the outer diameter is increased corresponding to the long hole.

In the second embodiment employing the structure provided with shield member 242, shield member 242 is press-fitted to fix the resolver, thereby eliminating the need for the hole through which a bolt is inserted. Furthermore, an adjustment handle 248 is attached to shield member 242 to allow the elimination of the long hole portion in the stator. Consequently, resolver stator 41 can be reduced in size, to thereby provide the benefits of enabling size reduction of a motor and a generator or cost reduction.

While the embodiments of the present invention have been described as above, the embodiments described herein can be variously modified.

The resolver to which the present invention is applied can also be applied to a motor and a generator, and a motor/generator. This motor/generator can be used in an electric vehicle and a hybrid vehicle. Furthermore, the present invention can also be applied not only to a motor/generator incorporated in the vehicle, but also to a motor/generator not incorporated in the vehicle, for example, a generator or a driving machine which is not involved in the vehicle.

In the present embodiment, although resolver stator 41 is press-fitted to the side of motor cover 304, the present embodiment is not limited to this, and resolver stator 41 may be press-fitted to the side of motor case 306. Motor case 306 and motor cover 304 may be formed of not only metal such as aluminum, but also nonmetal such as resin, organic matter and inorganic matter.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

According to the present invention, the resolver fixing structure can be used in the field of the resolver of the rotating electrical machine.

The invention claimed is:

1. A resolver comprising:
a rotation shaft;
a resolver rotor attached to an outer circumference of said rotation shaft; and
a resolver stator provided at an outer circumference of said resolver rotor and having a coil,
said resolver stator including a back yoke portion, and an annular shield member provided at an outer circumference of said back yoke portion and serving to reduce a magnetic field transmitted from outside of said back yoke portion to said back yoke portion, and
said shield member having an axial thickness greater than an axial thickness of said back yoke portion,
wherein no gap is provided in an axial direction of said back yoke portion, and
said shield member serves as a member having a function for preventing distortion of said back yoke portion when said resolver is press fitted into a hole of an outer base body for fixation.

2. The resolver according to claim 1, wherein said back yoke portion has a plurality of teeth portions on an inner circumferential surface on a side opposite to an outer circumferential surface on which said shield member is disposed.

3. The resolver according to claim 1, wherein said shield member is formed of magnetic material.

4. The resolver fixing structure according to claim 1, wherein said back yoke portion comprises continuous material between two end surfaces that together define an axial extent of said back yoke portion.

5. The resolver fixing structure according to claim 4, wherein said resolver stator has a plurality of teeth portions and all of said teeth portions are disposed in a single circumferential row on an inner circumferential surface of said back yoke portion.

6. A resolver comprising:
a rotation shaft;
a resolver rotor attached to an outer circumference of said rotation shaft; and
a resolver stator provided at an outer circumference of said resolver rotor and having a coil,
said resolver stator including a back yoke portion, and an annular shield member provided at an outer circumference of said back yoke portion and serving to reduce a magnetic field transmitted from outside of said back yoke portion to said back yoke portion, and
said shield member serving as a member having a function for preventing distortion of said back yoke portion when said resolver is press-fitted into a hole of an outer base body for fixation,
wherein no gap is provided in an axial direction of said back yoke portion.

7. The resolver according to claim 6, wherein said back yoke portion has a plurality of teeth portions on an inner circumferential surface on a side opposite to an outer circumferential surface on which said shield member is disposed.

8. The resolver according to claim 6, wherein said shield member is formed of magnetic material.

9. The resolver fixing structure according to claim 6, wherein said back yoke portion comprises continuous material between two end surfaces that together define an axial extent of said back yoke portion.

10. The resolver fixing structure according to claim 9, wherein said resolver stator has a plurality of teeth portions and all of said teeth portions are disposed in a single circumferential row on an inner circumferential surface of said back yoke portion.

11. A resolver fixing structure having a resolver and a base body for fixing said resolver,
said base body having a hole,
said resolver comprising:
a rotation shaft;
a resolver rotor attached to an outer circumference of said rotation shaft; and
a resolver stator provided at an outer circumference of said resolver rotor and having a coil,
said resolver stator including a back yoke portion, and an annular shield member provided at an outer circumference of said back yoke portion and serving to reduce a magnetic field transmitted from outside of said back yoke portion to said back yoke portion,
said shield member having an axial thickness greater than an axial thickness of said back yoke portion, and said shield member having a portion inserted into the hole of said base body for fixation,
wherein no gap is provided in an axial direction of said back yoke portion.

12. The resolver fixing structure according to claim 11, wherein said shield member serves as a member having a function for preventing distortion of said back yoke portion when said resolver is inserted into a hole of an outer base body for fixation.

13. The resolver fixing structure according to claim 11, wherein said shield member serves as a member having a function for preventing distortion of said back yoke portion when said resolver is press-fitted into a hole of an outer base body.

14. The resolver fixing structure according to claim 11, wherein said resolver is arranged between coil ends of a stator constituting a rotating electrical machine.

15. The resolver fixing structure according to claim 11, wherein said back yoke portion has a plurality of teeth portions on an inner circumferential surface on a side opposite to an outer circumferential surface on which said shield member is disposed.

16. The resolver fixing structure according to claim 11, wherein said shield member is formed of magnetic material.

17. The resolver fixing structure according to claim 11, wherein said resolver rotor and a rotor of a motor are connected to a single rotation shaft.

18. The resolver fixing structure according to claim 11, wherein said back yoke portion comprises continuous material between two end surfaces that together define an axial extent of said back yoke portion.

19. The resolver fixing structure according to claim 18, wherein said resolver stator has a plurality of teeth portions and all of said teeth portions are disposed in a single circumferential row on an inner circumferential surface of said back yoke portion.

* * * * *